F. SCHUBERT.
PRESSURE GAGE.
APPLICATION FILED JAN. 16, 1913.

1,112,845.

Patented Oct. 6, 1914.
2 SHEETS—SHEET 1.

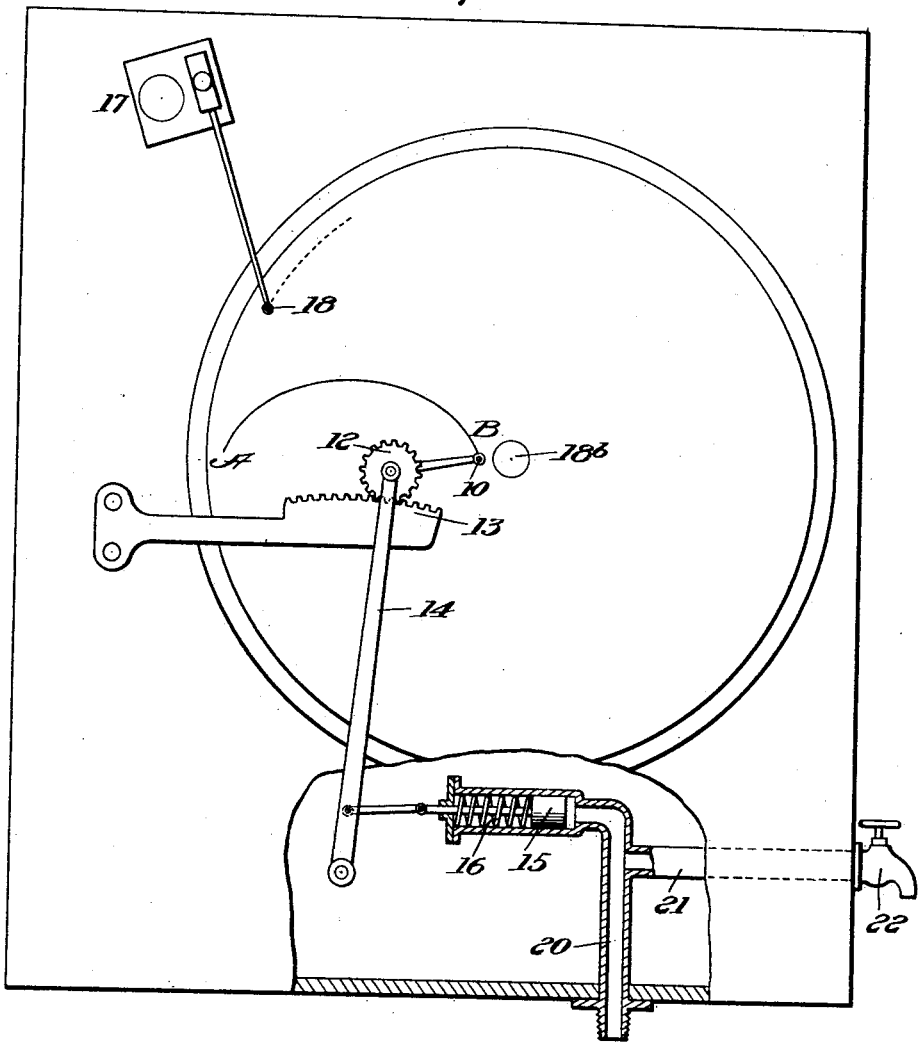

UNITED STATES PATENT OFFICE.

FREDERICK SCHUBERT, OF SELLERSVILLE, PENNSYLVANIA.

PRESSURE-GAGE.

1,112,845. Specification of Letters Patent. Patented Oct. 6, 1914.

Application filed January 16, 1913. Serial No. 742,505.

*To all whom it may concern:*

Be it known that I, FREDERICK SCHUBERT, of the city of Sellersville, in the county of Bucks and State of Pennsylvania, have invented certain new and useful Improvements in Pressure-Gages; and I do hereby declare the following to be a full, clear, and exact description of the invention, such as will enable others skilled in the art to which it appertains to make and use the same.

Figure 1:
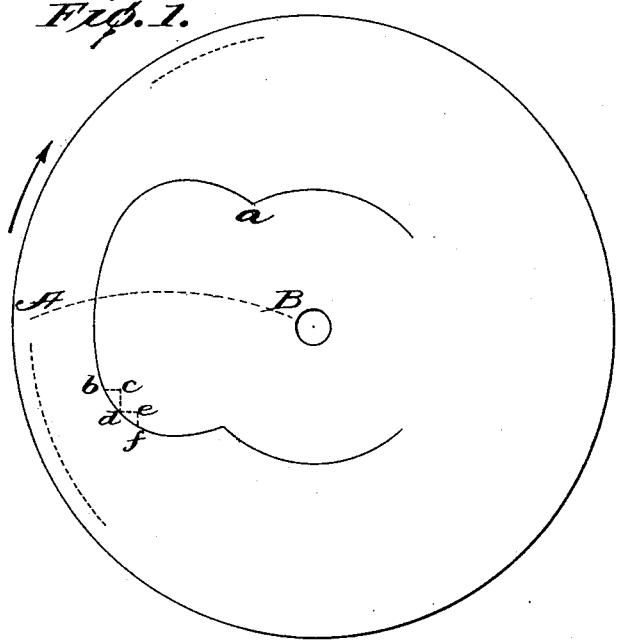
Figure 2:
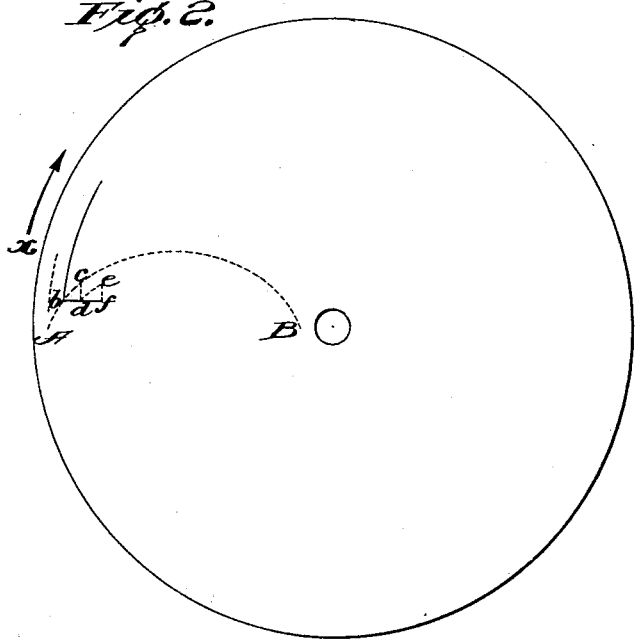

Figure 1 shows a record disk having pressure indications traced by apparatus of known form; Fig. 2 is a similar view showing a portion of a pressure tracing made by my apparatus, and Fig. 3 is a view of my apparatus in side elevation, parts being in section.

My invention contemplates an improvement in pressure gages, having reference primarily to that class of gages which record the variations of pressure in a water system.

Broadly stated, the invention comprehends a stylus, pen or other recording element which is actuated, through appropriate mechanism, by the variations in pressure, the pen tracing a line upon a rotating dial plate. To this extent the nature of the invention will be at once apparent since the foregoing involves no new feature.

In practical use, however, the important object to accomplish is to ascertain clearly and exactly the point on the dial where the beginning of a drop in pressure has been indicated. The dial plate, or a continuous strip fed between rolls, if desired, is moved in synchronism with a clock and a pen, stylus or other marking device indicates, by dots or dashes along the margin of the dial plate, the seconds and fractions thereof according to predetermined arrangement. There is comparatively less difficulty in properly recording an increase of pressure. This usually takes place near the center of rotation, where the peripheral speed is not great, so that the mark indicated by the lateral movement of the pen is not influenced to any material extent by the movement of the dial. When, however, a drop in pressure occurs it is most essential that the marking upon the dial indicate this instantaneously and clearly with reference to the time at which the drop in pressure commenced. Obviously this can only be properly read by the angle traced by the pen on the dial as the drop occurs. The drop in pressure may be quite small and owing to the rapid movement of the dial plate the recording pens, as heretofore operated, have merely made a curve at about the point where the drop occurred. They do not make a sharp angle and hence it is difficult, if not impossible, to ascertain the point relative to the dial indicator at which the drop commenced. In certain uses it is the point of commencement of the drop in pressure that is all important. I have found that the difficulty arises from the fact that in the construction heretofore known the path of movement of the pen has been substantially like that indicated by the line A—B in Fig. 1 of the accompanying drawings, that is an arc of a circle. With such a movement of the pen the increase of pressure will be clearly indicated as at $a$, whereas the drop of pressure, as at $b$, will not be indicated by a clear angle but rather by a curve, since indication of the mark $b$—$c$ is influenced by the rotation of the dial, indicated at $c$—$d$, and the same is true as to the drop indicated by $d$—$e$ and the motion of the dial indicated at $e$—$f$. Consequently the drop in pressure is not clearly shown and it is impossible to state exactly when it commenced to take place.

I have found that the desired object may be fully attained when the absolute or normal lateral path of the pen is substantially like the line A—B of Fig. 2. This path is substantially an epicycloid, relatively to the arc described by the arm carrying the pen. Consequently the pen actuated so as to follow this path will distinctly record the time of the beginning of the drop in pressure as the drop $b$—$c$ will be combined with the motion $c$—$d$ of the dial and the drop $d$—$e$ with the motion $e$—$f$ of the dial, thus indicating the drop by $b$, $d$, $f$.

Various means may be employed for operating the pen so that its absolute path will be the desired one. In Fig. 3 I have shown the pen 10 fast on a pinion 12, the latter engaging the rack bar 13 and being moved by the arm 14 which is actuated by a piston 15 according to variations in the water pressure. In this construction the absolute path of the pen is the line A—B, the pen being moved bodily along the lateral line of the rack bar but being fast to the pinion which turns relative to this lateral line. Consequently a drop in pressure which will allow the arm 14 to swing back under the tension of spring 16 will turn the pen at a sharp angle, thereby compensating for the motion of the dial. This is especially true when the pen is near the periphery of the rotating dial where the movement of the latter is greatest, because the direction of movement of the pen at that point is at an acute angle relatively to the periphery of the dial. Consequently the pressure drop b—c and d—e, Fig. 2, will be at such an angle as to compensate for the rotation of the chart or dial in the direction of the dart X and will indicate substantially the lines b, d, f, Fig. 2, which may be followed out radially to exactly the time indicated at the margin.

In Fig. 3 I have indicated a time recording mechanism at 17 which operates a recording instrument 18 adapted to mark the seconds and fractions thereof on the margin of the dial in the rotation thereof. The dial is preferably mounted on a shaft $18^b$ which may be actuated by suitable mechanism to rotate the dial at a predetermined speed. The water inlet 20 leading from a main is shown formed with a by-pass 21 having a valve 22 to allow air to escape from the piston cylinder.

I claim as my invention:—

1. In a pressure recording apparatus, the combination with a movable recording sheet, of a pen adapted to indicate pressures on said sheet, means actuated by pressure variations for moving said pen bodily relatively to said recording sheet, and means for swinging said pen relatively to said bodily moving means.

2. In a pressure recording apparatus, the combination with a movable recording sheet, of a pivoted arm actuated by pressure variations, a pen bodily movable by said arm and adapted to indicate pressures on said sheet, and means for moving said pen in an epicycloid relatively to the arc described by said arm.

3. In a pressure recording apparatus, the combination with a rotating dial, of a pen adapted to record pressures on said dial, means actuated by variations of pressure for bodily moving said pen substantially radially across said dial, and means for swinging said pen, in its bodily movement, in a path that intersects the line of its bodily movement at an acute angle.

4. In a pressure recording apparatus, the combination with a rotating dial, of a pen adapted to record pressures on said dial, means actuated by pressure variations for bodily moving said pen substantially radially across said dial, and means for imparting an independent movement to said pen, whereby when said pen is at or near the periphery of said dial its movement at the commencement of a drop in pressure is substantially concentric with that of the dial.

5. In a pressure recording apparatus, the combination with a rotating dial and means for marking time graduations thereon in its rotation, of a pivoted lever, means for swinging said lever consequent upon pressure variations, a pinion carried by said lever, a rack bar adjacent said dial with which said pinion engages, and a pen adapted to record pressures on said dial and rigidly secured to said pinion, for the purpose stated.

In testimony whereof, I have signed this specification in the presence of two subscribing witnesses.

FREDERICK SCHUBERT.

Witnesses:
FRED BLERET,
ERNEST SCHWIND.

---

Copies of this patent may be obtained for five cents each, by addressing the "Commissioner of Patents, Washington, D. C."